United States Patent
Sudo et al.

(10) Patent No.: US 8,241,799 B2
(45) Date of Patent: Aug. 14, 2012

(54) METHODS OF OPERATING FUEL CELL POWER GENERATORS, AND FUEL CELL POWER GENERATORS

(75) Inventors: Go Sudo, Kanagawa (JP); Kenji Katori, Kangawa (JP); Masahiko Tahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 459 days.

(21) Appl. No.: 11/574,791

(22) PCT Filed: Sep. 2, 2005

(86) PCT No.: PCT/JP2005/016133
§ 371 (c)(1),
(2), (4) Date: Mar. 26, 2007

(87) PCT Pub. No.: WO2006/028021
PCT Pub. Date: Mar. 16, 2006

(65) Prior Publication Data
US 2007/0218323 A1    Sep. 20, 2007

(30) Foreign Application Priority Data
Sep. 6, 2004 (JP) .............................. P2004-259044

(51) Int. Cl.
*H01M 8/04* (2006.01)
(52) U.S. Cl. ...................................... 429/413; 429/431
(58) Field of Classification Search ............... 429/12, 429/13, 22, 23, 429, 428, 431, 433, 413, 429/432, 443
See application file for complete search history.

(56) References Cited

U.S. PATENT DOCUMENTS

| | | | | |
|---|---|---|---|---|
| 3,542,597 | A * | 11/1970 | Klunder et al. | 429/17 |
| 5,366,821 | A * | 11/1994 | Merritt et al. | 429/21 |
| 5,763,113 | A * | 6/1998 | Meltser et al. | 429/13 |
| 6,461,751 | B1 * | 10/2002 | Boehm et al. | 429/432 |
| 6,884,529 | B2 * | 4/2005 | Xie et al. | 429/13 |
| 2002/0086193 | A1 | 7/2002 | Acker | |
| 2002/0187374 | A1 | 12/2002 | Yamauchi | |
| 2006/0141307 | A1 | 6/2006 | Ryoichi | |

FOREIGN PATENT DOCUMENTS

JP         48-27102        8/1973
(Continued)

OTHER PUBLICATIONS

Written Opinion corresponding to International Application No. PCT/JP2005/016133 filed on Sep. 2, 2005.
(Continued)

*Primary Examiner* — Jennifer Michener
*Assistant Examiner* — Monique Wills
(74) *Attorney, Agent, or Firm* — K&L Gates LLP (57) ABSTRACT

A method of operating a fuel cell power generator, and a fuel cell power generator to be operated by the method, which method enables feeding of a diluted fuel having an optimum concentration to a power generation unit even without measuring an absolute concentration typically using a sensor are provided. Specifically, how an output voltage of the power generation unit varies depending on a flow rate of a diluted fuel is monitored. Thus, the diluted fuel may be adjusted to have an optimum concentration always, even without measuring an absolute concentration typically using a sensor. According to this operation method, output characteristics and electrical efficiencies can be maximized according to a load and conditions of a fuel cell power generator.

4 Claims, 4 Drawing Sheets

FOREIGN PATENT DOCUMENTS

| | | |
|---|---|---|
| JP | 61-042871 | 3/1986 |
| JP | 2003-022830 | 1/2003 |
| JP | 2003-520399 | 7/2003 |
| JP | 2003-346850 | 12/2003 |
| JP | 2004-071260 | 3/2004 |
| JP | 2004-537150 | 12/2004 |
| WO | 2004/030134 A1 | 4/2004 |

OTHER PUBLICATIONS

Japanese Office Action dated Feb. 15, 2011, for corresponding Japanese Patent Application No. 2004-259044.

* cited by examiner

METHODS OF OPERATING FUEL CELL POWER GENERATORS, AND FUEL CELL POWER GENERATORS

CROSS REFERENCES TO RELATED APPLICATIONS

The present application claims priority to Japanese Patent Application JP 2004-259044 filed in the Japanese Patent Office on Sep. 6, 2004, the entire contents of which is being incorporated herein by reference.

BACKGROUND

The present application relates to a method of operating a fuel cell power generator, and a fuel cell power generator to be operated according to the method.

Fuel cells are power generating elements which are configured to carry out power generation by electrochemically reacting a fuel such as hydrogen or methanol with an oxidizing gas such as oxygen gas. They receive attention as power generating elements that do not invite environmental pollution, because power generation therein yields water as a product. Attempts have been made to use fuel cells, for examples, as electric power supplies for driving automobiles.

Fuel cells are classified as various types typically by electrolyte, and representative examples thereof are fuel cells using solid polymer electrolytes as electrolytes. Such solid polymer electrolyte fuel cells can be obtained at low cost, can easily come down in size, thickness, and/or weight, and show high output densities as their cell performance. Accordingly, they are promising as electric power supplies for driving electronic equipment. Some of solid polymer electrolyte fuel cells use hydrogen as a fuel. There have also been developed solid polymer electrolyte fuel cells using methanol or natural gas as a fuel, which fuel is reformed into hydrogen. In addition, direct methanol fuel cells (DMFCs) have been developed, in which methanol as a fuel is directly fed to fuel cells, and power generation is carried out.

Direct methanol fuel cells each have a power generation cell including an electrolyte, such as a solid polymer electrolyte, sandwiched between a cathode and an anode. In direct methanol fuel cells, an aqueous methanol solution is fed to the anode so as to cause a reaction between methanol and water on the surface of the anode, which reaction is represented by: $CH_3OH+H_2O \rightarrow CO_2+6H^++6e^-$. Air is fed to the cathode so as to cause a reaction on the surface of the cathode among oxygen in the air, and an electron (e-) and a proton (H+) formed in the anode, which reaction is represented by: $3/2O_2+6H^++6e^- \rightarrow 3H_2O$. Specifically, methanol as a fuel, if used alone, does not act to proceed a reaction. Accordingly, both methanol and water should be fed as a mixture to the anode.

Feeding processes herein include, for example, a process of mixing methanol and water to yield an aqueous methanol solution having an appropriate concentration, and feeding the aqueous methanol solution to an anode. This process may simplify the system. However, when methanol and water are fed as a mixture having an appropriate concentration, it is difficult to vary the concentration of the aqueous methanol solution in accordance with conditions in operation of direct methanol fuel cells. This is because a methanol concentration to yield a maximum output is generally different from a methanol concentration to yield a maximum efficiency in direct methanol fuel cells. Certain direct methanol fuel cells each include a membrane electrode assembly (MEA) using a solid electrolyte typified by Nafion®. In fuel cells of this type, the membrane electrode assembly deteriorates at a higher speed with an increasing concentration of methanol. The methanol concentration herein is increased in order to increase energy density.

Another feeding process is a process of mixing methanol in a high concentration with water in a fuel cell power generator to thereby yield an aqueous methanol solution having an appropriate concentration, and feeding the aqueous methanol solution to an anode. The water herein is formed in a cathode as a result of power generation. According to this process, the concentration of the aqueous methanol solution can be adjusted suitably according to conditions of a fuel cell power generator. To adjust the concentration, however, the concentration of the aqueous methanol solution should be detected or determined. To detect the concentration, there are used concentration sensors and cells therefor, according typically to a static capacitor method, an electrochemical oxidation method, an ultrasonic method, or a densimetric method.

These concentration sensors exhibit excellent properties when a fuel mixture includes methanol and water alone. However, direct methanol fuel cells may invite by-products such as formic acid as a result of side reactions of power generation reactions, and such by-products cause errors in measured concentrations. Accordingly, measured concentrations including some errors makes it difficult to feed an aqueous methanol solution having an optimum concentration. Fuel cells, if including sensing cells, generally show a varying output with time. The fuel cells thereby show different outputs with elapse of time during operation. In addition, histories of fuel cells affect the degree of variation in output of such fuel cells. Accordingly, it is difficult to continue detecting absolute concentrations.

There is reported a process of determining a concentration of an aqueous methanol solution without such sensors, feeding the aqueous methanol solution at a flow rate suitable to the concentration, and thereby optimizing the operation of a fuel cell power generator (for example, Japanese Unexamined Patent Application Publication (JP-A) No. 2003-22830). According to this process, a concentration of an aqueous methanol solution is determined by calculation based on the output current and operating duration of the fuel cell power generator; the aqueous methanol solution is fed to a power generation unit at a flow rate varied depending on the determined concentration; and the fuel cell power generator is thereby operated in an optimum manner.

It is desirable to optimize the concentration of a fuel depending on an operation condition, so as to maximize output characteristics and electrical efficiency. It is difficult, however, to optimize the concentration of a fuel according to this process.

Japanese Unexamined Patent Application Publication (JP-A) No. 2003-22830 discloses yet another process. According to this process, the concentration of an aqueous methanol solution is determined by carrying out predetermined computations using an output current and an operating duration as parameters. The process does not use a sensor for detecting the concentration. Thus, the aqueous methanol solution is fed to a fuel cell at an optimum flow rate which is set based on the determined concentration. Specifically, the fuel cell is operated in an optimum manner set depending not on the concentration but on the flow rate of the aqueous methanol solution according to this process. The flow rate should therefore be controlled minutely. In addition, the determined concentration may have an error, because fuel cells tend to exhibit varying outputs with time, and histories of fuel cells affect the degree of the variation. Furthermore, complicated computations should be carried out so as to determine concentrations.

Additional features and advantages of the present application are described in, and will be apparent from, the following Detailed Description and the figures.

SUMMARY

A fuel cell power generator is provided according to an embodiment. According to this method, a diluted fuel having an optimum concentration can be fed to a power generation unit even without determining an absolute concentration typically using a sensor. In addition, the concentration of the diluted fuel can be adjusted so as to maximize output characteristics and electrical efficiencies of the fuel cell power generator, according to the load and/or the condition of the fuel cell power generator. Another object of the present application is to provide a fuel cell power generator which can be operated according to this method, in which a diluted fuel having an optimum concentration is fed, which concentration is adjusted so as to maximize output characteristics and electrical efficiencies.

According to an embodiment, there is provided a method of operating a fuel cell power generator. The fuel cell power generator includes a power generation unit configured to carry out power generation using air and a diluted fuel containing a material fuel and water. The method includes the steps of varying the flow rate of the diluted fuel to be fed to the power generation unit, determining an output voltage of the power generation unit, and adjusting the concentration of the diluted fuel based on how the output voltage varies depending on the flow rate of fuel.

According to a method of operating a fuel cell power generator according to an embodiment, a diluted fuel always having an optimum concentration can be fed to a power generation unit of a fuel cell power generator, even when the power generator has no concentration sensor. In addition, the concentration of a diluted fuel can be adjusted according to the load and condition of a fuel cell power generator, so as to yield maximized output characteristics and electrical efficiencies.

According to an embodiment, there is also provided a fuel cell power generator which includes a power generation unit configured to carry out power generation using air and a diluted fuel containing a material fuel and water; a fuel feeder configured to feed the diluted fuel to the power generation unit at a predetermined flow rate; a voltage-measuring unit configured to measure an output voltage of the power generation unit; and a fuel-mixing unit configured to adjust the concentration of the diluted fuel. The fuel-mixing unit is configured to adjust the concentration of the diluted fuel based on how an output voltage of the power generation unit varies depending on a flow rate of fuel, the output voltage being measured by the action of the voltage-measuring unit, and the flow rate of fuel being the flow rate of a fuel to be fed from the fuel feeder to the power generation unit.

A fuel cell power generator according to an embodiment is so configured as to feed a diluted fuel always having an optimum concentration to a power generation unit. The power generator can maximize output characteristics and electrical efficiencies, because a diluted fuel adjusted so as to always have an optimum concentration is fed to a power generation unit, even when the load varies and/or the condition of the fuel cell power generator varies due to the deterioration of the power generator.

According to a method of operating a fuel cell power generator according to an embodiment, a diluted fuel always having an optimum concentration can be fed to a power generation unit of a fuel cell power generator even when the power generator does not have, for example, concentration sensors. Specifically, a fuel cell power generator can be operated without being affected by-products and the deterioration of sensors. Such effects are problems when the concentration is adjusted using concentration sensors. According to the method, the concentration of a diluted fuel can be adjusted so as to maximize output characteristics and electrical efficiencies according to the load and condition of the fuel cell power generator.

A fuel cell power generator according to an embodiment is so configured as to feed a diluted fuel adjusted to always have an optimum concentration according to the operation method. It can also maximize output characteristics and electrical efficiencies.

DETAILED DESCRIPTION

A method of operating a fuel cell power generator, and a fuel cell power generator according to the present application will be illustrated in detail with reference to the attached drawings.

Figure 1:
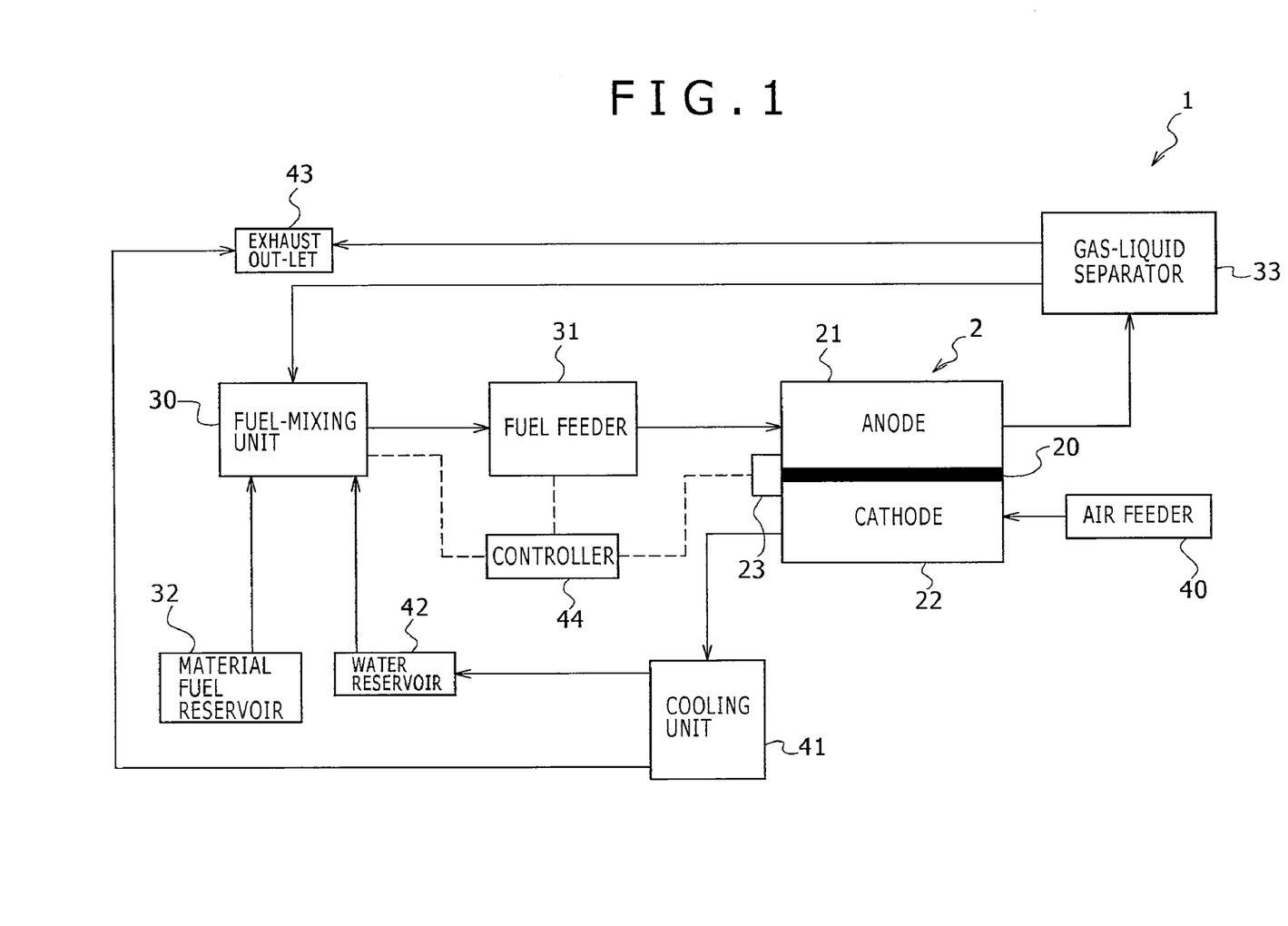
FIG. 1 is a schematic diagram of a fuel cell power generator according to the present application.

A fuel cell power generator 1 is operated by a method according to an embodiment of the present application. The fuel cell power generator 1 includes a power generation unit 2 which is configured to carry out power generation using air and an aqueous methanol solution containing methanol diluted with water. The aqueous methanol solution corresponds to a diluted fuel, and the methanol corresponds to a material fuel. According to the method, an output voltage of the power generation unit 2 is determined at a varying flow rate of the aqueous methanol solution as a fuel to be fed to the power generation unit 2. The concentration of the aqueous methanol solution as fuel is optimized based on how the output voltage varies depending on the flow rate of fuel.

FIG. 1 is a schematic diagram illustrating an embodiment of a fuel cell power generator 1 to be operated by a method of operating a fuel cell power generator 1 according to the present application. The fuel cell power generator 1 includes a power generation unit 2, a fuel-mixing unit 30, a fuel feeder 31, a material fuel reservoir 32, a gas-liquid separator 33, an air feeder 40, a cooling unit 41, a water reservoir 42, an exhaust out-let 43, and a controller 44. The power generation unit 2 includes a pair of electrodes and an electrolyte membrane 20 sandwiched between the pair of electrodes. The pair of electrodes include an anode 21 serving as a negative electrode, and a cathode 22 serving as a positive electrode. The fuel-mixing unit 30 is configured to adjust an aqueous methanol solution for use in a power generation reaction to have a predetermined concentration. The fuel feeder 31 is configured to feed the aqueous methanol solution from the fuel-mixing unit 30 to the power generation unit 2. The material fuel reservoir 32 is configured to store methanol as a material fuel to be diluted in the fuel-mixing unit 30. The gas-liquid separator 33 is configured to separate a discharged fuel from the power generation unit 2 into a gaseous component and a liquid component. The air feeder 40 is configured to feed air to the power generation unit 2. The cooling unit 41 is configured to cool air discharged from the power generation unit 2 and separate the same into water and other substances. The water reservoir 42 is configured to store water separated in the cooling unit 41. The exhaust out-let 43 is configured to discharge or exhaust the gaseous component separated in the gas-liquid separator 33, and to discharge or exhaust the other substances separated in the cooling unit. The controller 44 is configured to control respective members of the fuel cell power generator 1. One or more valves, for example, may be arranged between respective members. The flow of the aqueous methanol solution and/or air may be controlled by opening and closing such a valve.

The power generation unit 2 includes the electrolyte membrane 20, the anode 21, and the cathode 22. The electrolyte membrane 20 is in the form of a membrane and capable of allowing protons to pass therethrough. The anode 21 and the cathode 22 contain catalysts acting in power generation reactions. The anode 21 and the cathode 22 are arranged so as to sandwich the electrolyte membrane 20 to thereby constitute the power generation unit 2. The proton-permeable electrolyte membrane 20 may include a material which allows protons to pass therethrough, is resistant to oxidation, and is thermally stable. The anode 21 and the cathode 22 may include, for example, metal materials, carbonaceous materials, and electroconductive nonwoven fabrics. A carbonaceous material, for example, may carry a catalyst such as platinum on its porous surface. The dimensions (sizes) and shapes of the electrolyte membrane 20, the anode 21, and the cathode 22 may be appropriately set according to the dimensions and shape of the power generation unit 2.

The power generation unit 2 includes a voltage-measuring unit 23 configured to determine an output voltage of the power generation unit 2. When an output voltage of the power generation unit is measured by the action of the voltage-measuring unit 23, it is transmitted to the controller 44. The fuel-mixing unit 30 is configured to adjust the concentration of the aqueous methanol solution based on the measured output voltage and the flow rate of the aqueous methanol solution fed from the fuel feeder 31. The fuel cell power generator 1 shown FIG. 1 is a direct methanol fuel cell power generator, in which the power generation unit 2 uses an aqueous methanol solution as a fuel, and an aqueous methanol solution is directly fed to the power generation unit 2. The configuration of a fuel cell power generator 1 according to the present application is not limited to this, and can be modified and arranged suitably according to the power generation ability of a constitutional fuel cell. The power generation unit 2 may further include a temperature-measuring device configured to measure the temperature of the power generation unit 2. By satisfying this, the power generator may be controlled, for example, so as to prevent overheating due to heat generation from the power generation unit 2. Such heat is generated as a result of power generation reactions.

The fuel-mixing unit 30 is connected typically via a pump and/or a valve to the material fuel reservoir 32 and is connected via the fuel feeder 31 to the power generation unit 2. The fuel-mixing unit 30 is configured to adjust the concentration of an aqueous methanol solution by mixing methanol and water. The aqueous methanol solution serves as a material fuel for power generation reactions in the power generation unit 2. The methanol herein is a material fuel and is stored in the material fuel reservoir 32. The water is stored in the water reservoir 42. An aqueous methanol solution having an adjusted concentration is fed via the fuel feeder 31 to the power generation unit 2 and is used in power generation reactions. The fuel-mixing unit 30 is so configured as to adjust the concentration under the control of the controller 44, based on the output voltage of the power generation unit 2 and the flow rate of the aqueous methanol solution from the fuel feeder 31 to the power generation unit 2.

The fuel feeder 31 is connected to the fuel-mixing unit 30 and to the power generation unit 2. The fuel feeder 31 is configured to feed an aqueous methanol solution to the anode 21 of the power generation unit 2 at a predetermined flow rate, which aqueous methanol solution has been adjusted in the fuel-mixing unit 30. The flow rate of the aqueous methanol solution can be appropriately set by the action of the controller 44. The flow rate of the aqueous methanol solution is transmitted to the controller 44 and serves as a parameter for adjusting the concentration of the aqueous methanol solution. The concentration of the aqueous methanol solution can be adjusted in the fuel-mixing unit 30 under the control of the controller 44, based on the flow rate of the aqueous methanol solution and the output voltage of the power generation unit 2. Another member or component, such as a valve or pump, can be arranged instead of the fuel feeder 31, as long as it is capable of controlling the flow rate of an aqueous methanol solution to be fed to the power generation unit 2. Such a configuration can be appropriately modified according to a fuel cell power generator 1. The fuel feeder 31 may have a filter configured to remove dust and impurities from an aqueous methanol solution to be fed to the power generation unit 2.

The material fuel reservoir 32 is connected typically via a pump and/or a valve to the fuel-mixing unit 30. It is configured to store methanol as a material fuel to be fed to the fuel-mixing unit 30. It is also configured to feed a necessary amount of methanol to the fuel-mixing unit 30 typically via a valve and/or a pump arranged between the material fuel reservoir 32 and the fuel-mixing unit 30. This feeding is carried out according to a requirement of the fuel-mixing unit 30 and is controlled by the controller 44.

The gas-liquid separator 33 is connected to the power generation unit 2 and to the fuel-mixing unit 30. The gas-liquid separator 33 is so configured as to separate a discharged fuel into a liquid component and a gaseous component. The discharged fuel is discharged from the anode 21 of the power generation unit 2. The liquid component may be fed typically via a pump and/or a filter to the fuel-mixing unit 30, be mixed with methanol and water and be fed, as a fuel, via the fuel feeder 31 to the anode 21 of the power generation unit 2. The gaseous component may be discharged or exhausted via the exhaust out-let 43 out of the power generator.

The air feeder 40 is connected to the power generation unit 2 and is so configured as to feed air to the cathode 22 of the power generation unit 2. The air feeder 40 is not specifically limited, as long as it is capable of feeding air to the cathode 22 of the power generation unit 2 in an amount sufficient for power generation reactions. The air feeder 40 can be, for example, a fan and/or a pump. The fed air is used in power generation reactions in the power generation unit 2. The air feeder 40 may have a filter so as to remove dust and impurities from the air to be fed to the power generation unit 2.

The cooling unit 41 is connected to the power generation unit 2, to the water reservoir 42, and to the exhaust out-let 43. The cooling unit 41 is so configured as to cool air discharged from the cathode 22 of the power generation unit 2 to thereby separate water from the discharged air. The cooling unit 41 is also so configured as to feed the separated water to the water reservoir 42. A gaseous component after separation of water is transmitted to the exhaust out-let 43 and is discharged out of the power generator, together with a gaseous component discharged from the gas-liquid separator 33. The power generator according to this embodiment includes the cooling unit 41 so as to separate water from air discharged from the cathode 22. The power generator, however, may have another configuration, as long as water in the discharged air can be separated. The power generator may further have a member or component, such as a pump, so as to feed water to the water reservoir 42. It may also have a filter configured to remove dust and impurities from the water to be fed to the water reservoir 42.

The water reservoir 42 is connected to the cooling unit 41 and to the fuel-mixing unit 30. The water reservoir 42 is configured to store water separated in the cooling unit 41, which water can be used for adjusting an aqueous methanol solution in the fuel-mixing unit 30. The water stored in the water reservoir 42 can be fed to the fuel-mixing unit 30 typically via a valve and/or a pump, according to the concentration of the aqueous methanol solution to be adjusted in the fuel-mixing unit 30.

The exhaust out-let 43 is connected to the gas-liquid separator 33 and to the cooling unit 41 and includes an opening configured to discharge gases out of the power generator. The exhaust out-let 43 is so configured as to exhaust gaseous components out of the power generator. The gaseous components include a gaseous component discharged from the gas-liquid separator 33, and a gaseous component derived from air discharged from the cathode 22, from which water has been separated in the cooling unit 41. Such gaseous components to be discharged out of the power generator may be subjected to burning of combustible compounds contained therein, before discharging. This may prevent, for example, by-products formed as a result of power generation reactions from releasing out of the power generator.

The controller 44 is so configured as to control the fuel-mixing unit 30, the material fuel reservoir 32, and the water reservoir 42 so as to optimize the concentration of an aqueous methanol solution based on an output voltage and a flow rate of fuel. The output voltage is of the power generation unit 2, and the flow rate of fuel is of the aqueous methanol solution fed from the fuel feeder 31 to the power generation unit 2. For increasing the concentration of an aqueous methanol solution based on the output voltage and the flow rate of the fuel aqueous methanol solution, the power generator may be, for example, so configured as to feed methanol from the material fuel reservoir 32 to the fuel-mixing unit 30 under the control of the controller 44 to thereby increase the concentration of the aqueous methanol solution in the fuel-mixing unit 30. In contrast, for decreasing the concentration of an aqueous methanol solution, the power generator may be, for example, so configured as to feed water from the water reservoir 42 to the fuel-mixing unit 30 to thereby decrease the concentration of the aqueous methanol solution in the fuel-mixing unit 30. The concentration of an aqueous methanol solution may be optimized based on the temperature of the power generation unit 2. The temperature herein may be measured by a temperature measuring device which the power generation unit 2 may have.

The aqueous methanol solution is adjusted to have a predetermined concentration in the fuel-mixing unit 30 under the control of the controller 44. The concentration herein is adjusted by feeding methanol and water to the fuel-mixing unit 30 from the material fuel reservoir 32 and the water reservoir 42, respectively. The aqueous methanol solution after the adjustment in the fuel-mixing unit 30 is fed at a predetermined flow rate via the fuel feeder 31 to the anode 21 of the power generation unit 2. Air is fed from the air feeder 40 to the cathode 22 of the power generation unit 2.

Thus, power generation reactions may occur in the power generation unit 2 by feeding an aqueous methanol solution to the anode 21 of the power generation unit 2 and feeding air to the cathode 22 of the power generation unit 2. The power generation reactions may occur in the following manner. A reaction represented by: $CH_3OH+H_2O \rightarrow CO_2+6H^++6e^-$ occurs in the anode 21. This reaction is between water and methanol contained in the fed aqueous methanol solution. Protons (H+) formed as a result of this reaction permeate the electrolyte membrane 20 and move to the cathode 22. The formed electrons (e−) move from the anode 21 via an external circuit to the cathode 22. The moved protons and electrons cause, in the cathode 22, a reaction represented by: $3/2O_2+6H^++6e^- \rightarrow 3H_2O$ with oxygen contained in fed air. Accordingly, a power generation unit 2 of a fuel cell power generator 1 according to the present application may be so configured to carry out power generation reactions by feeding thereto an aqueous methanol solution and air.

An aqueous methanol solution discharged from the anode 21 of the power generation unit 2 is fed to the gas-liquid separator 33. The gas-liquid separator 33 is so configured as to separate the discharged aqueous methanol solution into a gas and a liquid. This allows separation of a gaseous component such as carbon dioxide from the aqueous methanol solution. Such gaseous components contaminated in the aqueous methanol solution are generated as a result of power generation reaction in the power generation unit 2. After separating a gaseous component therefrom, an aqueous methanol solution as a liquid component is fed to the fuel-mixing unit 30, in which the aqueous methanol solution is adjusted to a predetermined concentration to be fed to the power generation unit 2.

Air discharged from the cathode 22 of the power generation unit 2 is fed to the cooling unit 41 and is cooled therein. This enables the separation of water which has been formed as a result of power generation reactions in the power generation unit 2 and contaminated in the air. The separated water is fed to the water reservoir 42. The water stored in the water reservoir 42 is used for adjusting the concentration of an aqueous methanol solution in the fuel-mixing unit 30. The gaseous component, such as carbon dioxide, separated from the aqueous methanol solution in the gas-liquid separator 33, and air separated from water in the cooling unit 41 are both fed to the exhaust out-let 43 and are discharged out of the power generator.

Figure 2:
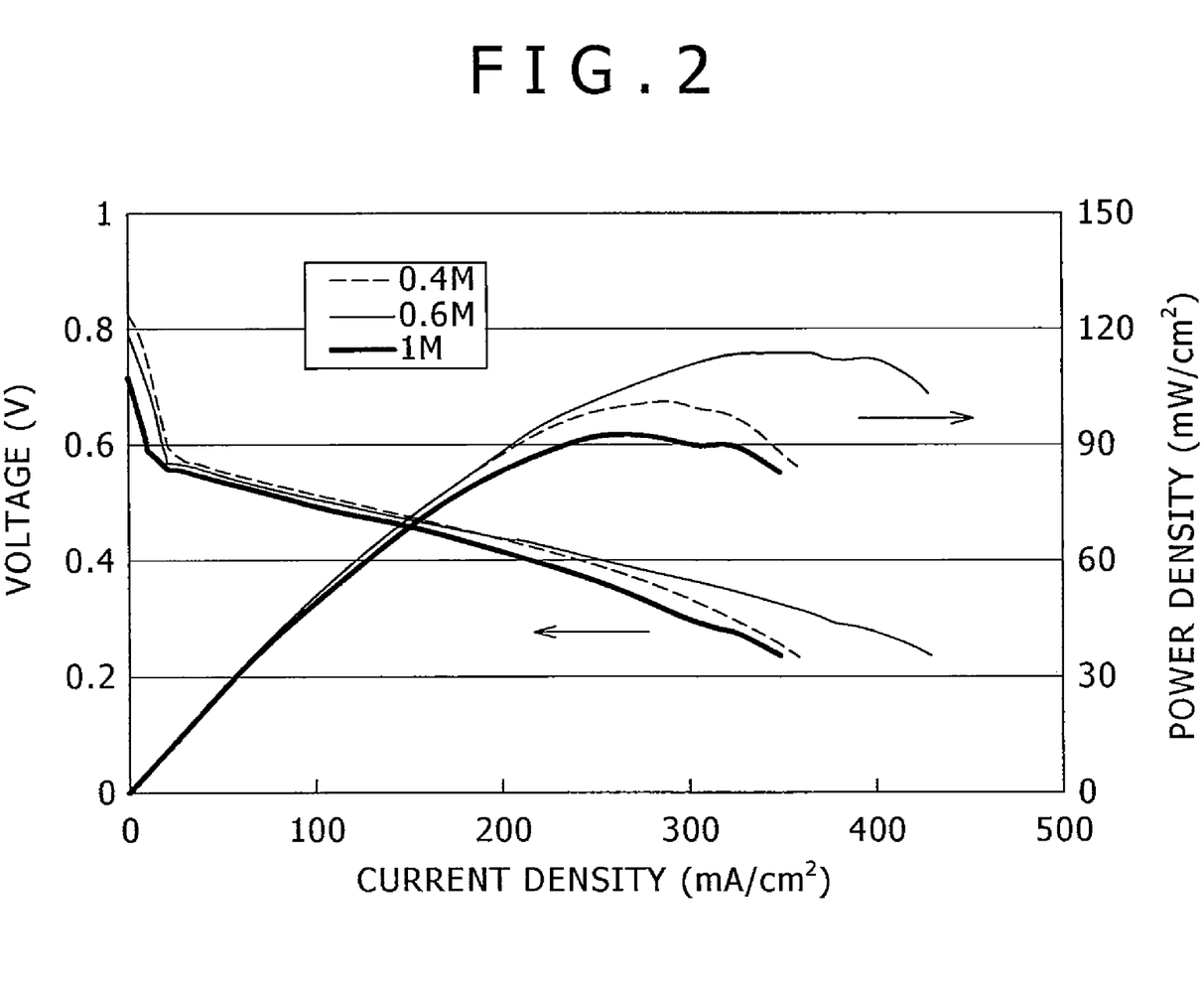
FIG. 2 is a graph showing examples of current-voltage characteristics and current output characteristics of a fuel cell power generator according to the present application, as determined at a constant flow rate.

FIG. 2 is a graph showing examples of current-voltage characteristics and current output characteristics of a fuel cell power generator, as determined at a constant flow rate. FIG. 2 shows how the current-voltage characteristics and current output vary depending on different concentrations of 1 mol/l, 0.6 mol/l, and 0.4 mol/l ("mol/l" is indicated as "M" in the figure), while setting the flow rate of an aqueous methanol solution constant. A fuel cell power generator shown in FIG. 2 is a fuel cell power generator which is optimized so as to yield a maximum output at a concentration of an aqueous methanol solution of 0.6 mol/l. The air flow rate herein is set constant. With reference to FIG. 2, when an aqueous methanol solution having a concentration of 0.6 mol/l, the optimum concentration, is used, the power generator shows a maximum output voltage and a maximum output power at the same current density. When an aqueous methanol solution having a concentration of 1 mol/l, higher than the 0.6 mol/l aqueous methanol solution, is used, the power generator shows a lower output voltage and a lower output power than those of the 0.6 mol/l aqueous methanol solution, as compared at a predetermined output current. This is because a phenomenon called as "cross-over" occurs in which methanol in an aqueous methanol solution fed to an anode of a power generation unit permeates an electrolyte and moves to a cathode, and this invites decrease in current-voltage characteristics and current output characteristics.

In contrast, when an aqueous methanol solution having a concentration of 0.4 mol/l, lower than the 0.6 mol/l aqueous methanol solution, is used, the power generator shows a lower output voltage and a lower output power than those using the 0.6 mol/l aqueous methanol solution, as compared at a predetermined output current. This is because water is insufficient in the former case to thereby adversely affect current-voltage characteristics and current output characteristics. These results demonstrate that an aqueous methanol solution having an optimum concentration should be fed to the power generation unit so as to carry out power generation reactions in an optimum manner.

The current-voltage characteristics and current output characteristics of a power generation unit vary depending typically on degradation of an electrolyte with time. Specifically, an optimum concentration of an aqueous methanol solution for use in a fuel cell power generator before first run (first operation) may differ from an optimum concentration of an aqueous methanol solution for use in the fuel cell power generator after a predetermined operating duration. Accordingly, the concentration of an aqueous methanol solution should be adjusted with flexibility so as to carry out an operation always in an optimum manner.

Figure 3:
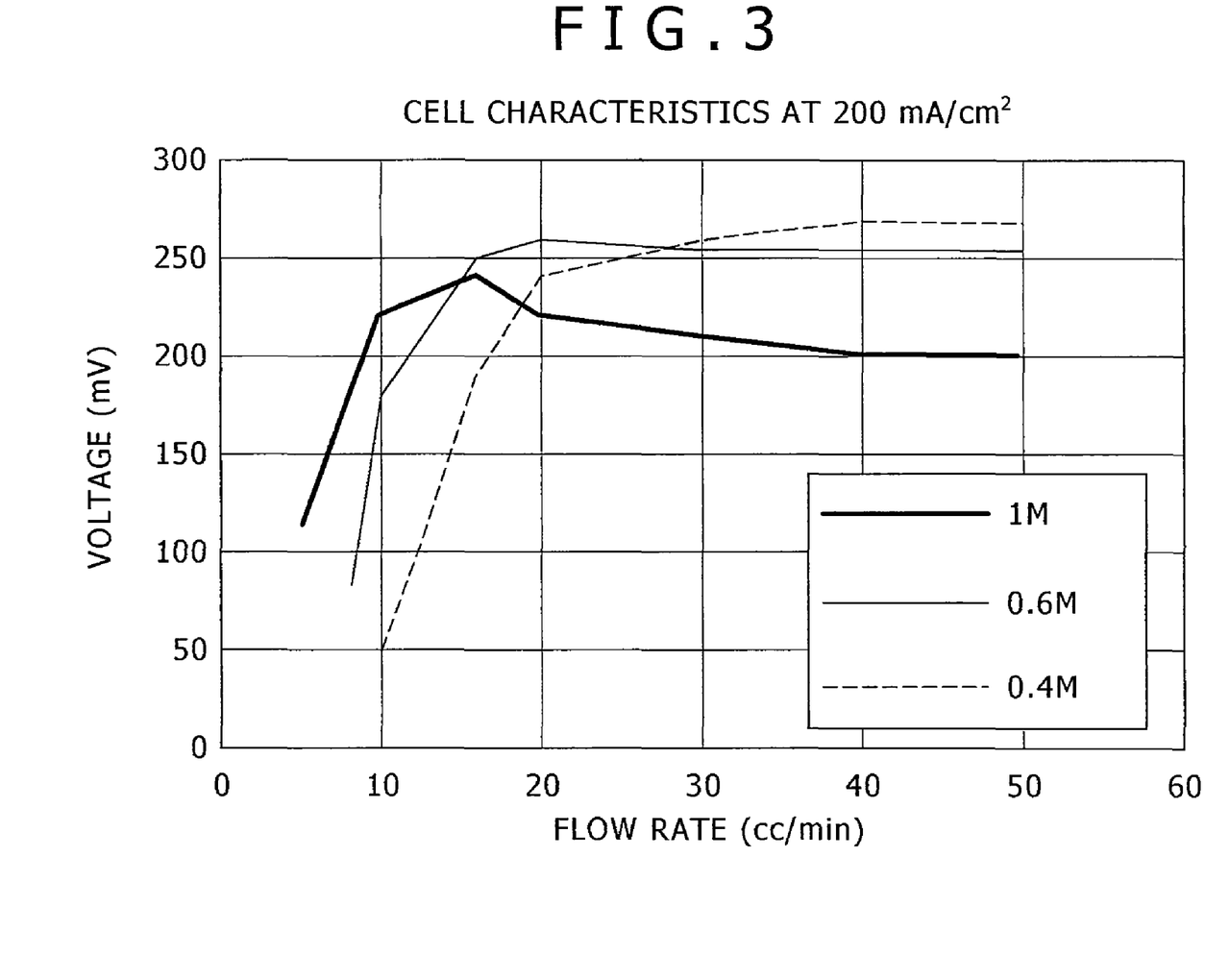
FIG. 3 is a graph illustratively showing how the output voltage of a power generation unit varies, at a constant current density, depending on the flow rate of a diluted fuel fed to the power generation unit in a fuel cell power generator according to the present application.

FIG. 3 is a graph illustrating how the output voltage of a power generation unit varies depending on the flow rate of an aqueous methanol solution fed to a power generation unit, as determined at a constant current density. FIG. 3 shows how the output voltage varies at different concentrations of, for example, 1 mol/l, 0.6 mol/l, and 0.4 mol/l, respectively. The air flow rate herein is set constant. A fuel cell power generator having such characteristics as shown in FIG. 3 is so configured as to operate steadily at a flow rate of an aqueous methanol solution of 20 cc/min. FIG. 3 demonstrates, for example, that the power generator shows a constant output voltage at flow rates of 20 cc/min or more using an aqueous methanol solution having a concentration of 0.6 mol/l, when its power generation unit is optimized at a concentration of an aqueous methanol solution of 0.6 mol/l, as in FIG. 2, The power generator shows a decreasing output voltage with an increasing flow rate, when an aqueous methanol solution having a concentration of 1 mol/l, higher than the optimum concentration, is used. In contrast, the power generator shows an increasing output voltage with an increasing flow rate, when an aqueous methanol solution having a concentration of 0.4 mol/l, lower than the optimum concentration, is used.

A method according to the present application operates a fuel cell power generator based on how a voltage varies depending on a flow rate at different concentrations of an aqueous methanol solution. When the output voltage shows no variation at an increasing flow rate of an aqueous methanol solution, it indicates that the aqueous methanol solution has an optimized concentration. When the output voltage decreases with an increasing flow rate of an aqueous methanol solution, it indicates that the aqueous methanol solution has a concentration higher than its optimum concentration. When the output voltage increases with an increasing flow rate of an aqueous methanol solution, it indicates that the aqueous methanol solution has a concentration lower than its optimum concentration.

Specifically, when the output voltage decreases with an increasing flow rate of an aqueous methanol solution, the aqueous methanol solution can have an optimum concentration by adjusting the aqueous methanol solution so as to have a lower concentration. In contrast, when the output voltage increases with an increasing flow rate of an aqueous methanol solution, the aqueous methanol solution can have an optimum concentration by adjusting the aqueous methanol solution to as to have a higher concentration.

The concentration of an aqueous methanol solution can also be adjusted based on how an output voltage varies with a decreasing flow rate. For example, when the output voltage decreases with a decreasing flow rate of an aqueous methanol solution, it indicates that the aqueous methanol solution has a concentration lower than its optimum concentration. An aqueous methanol solution having an optimum concentration can be obtained by adjusting the aqueous methanol solution so as to have a higher concentration. In contrast, when the output voltage increases with a decreasing flow rate of an aqueous methanol solution, it indicates that the aqueous methanol solution has a concentration higher than its optimum concentration. An aqueous methanol solution having an optimum concentration can be obtained by adjusting the aqueous methanol solution so as to have a lower concentration.

As is described above, the concentration of an aqueous methanol solution to be fed to a power generation unit can be optimized even without using, for example, a concentration sensor for determining the concentration. In addition, even when current-voltage characteristics and current output characteristics vary due typically to deterioration of an electrolyte, the concentration of an aqueous methanol solution can be adjusted based on the output of a power generation unit so as to yield a maximum output at the point of time.

Figure 4:
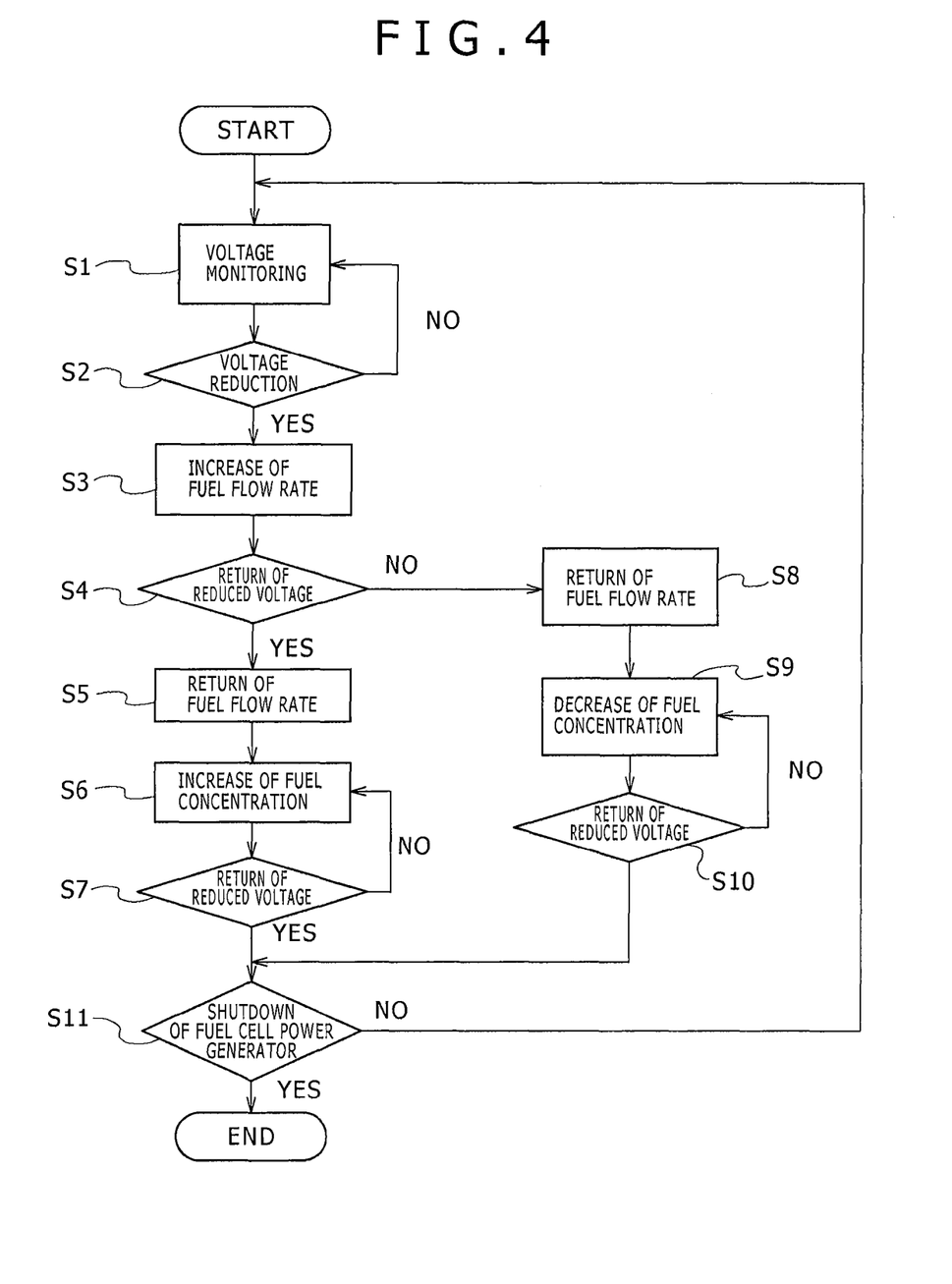
FIG. 4 is a flow chart showing how a fuel cell power generator is operated according to the present application.

FIG. 4 is a flow chart illustrating how a fuel cell power generator is operated according to the present application. When a fuel cell power generator to be operated by the method according to the present application starts operating, an aqueous methanol solution and air are fed to a power generation unit, in which power generation reactions proceed as above. Specifically, when the fuel cell power generator starts operating, an output voltage of the power generation unit is measured in a voltage-measuring unit, the measured output voltage is transmitted to a controller, and the controller monitors a variation of the output voltage (Step S1). In this step, the current density of the power generation unit is maintained constant. Next, when the controller does not detect decrease in the output voltage in Step S2, the operation returns to Step S1, and the output voltage of the power generation unit is continuously monitored through the voltage-measuring unit by the controller.

When the controller detects decrease in output voltage of the power generation unit in Step S2, a treatment shown in Step S3 is carried out. A decrease in output voltage of the power generation unit indicates that an aqueous methanol solution having an optimum concentration in the power generation unit is not fed. Accordingly, an aqueous solution to be fed to the power generation unit should be adjusted to have an optimum concentration. With reference to FIG. 3, the output voltage decreases with an increasing flow rate of an aqueous methanol solution, when the aqueous methanol solution has a concentration higher than its optimum concentration. In contrast, the output voltage increases with an increasing flow rate of an aqueous methanol solution, when the aqueous methanol solution has a concentration lower than its optimum concentration. By using this, there can be determined whether the concentration of an aqueous methanol solution to be fed to power generation unit is higher or lower than its optimum concentration, as a result of increasing the flow rate of the aqueous methanol solution.

In Step S3, the controller controls a fuel feeder so as to increase the flow rate of fuel. In Step 4, an output voltage measured by the voltage-measuring unit of the power generation unit is compared in the controller with the initial output voltage monitored in Step S1. When the controller does not detect return of a reduced output voltage, the controller controls the fuel feeder in Step S8 so as to return the increased flow rate of fuel to the initial flow rate, which increased flow rate has been increased in Step S3. Then the controller controls the fuel-mixing unit so as to reduce the concentration of an aqueous methanol solution (Step S9). In contrast, when the controller detects return of a reduced output voltage, the controller controls the fuel feeder so as to return the increased flow rate of fuel to the initial flow rate (Step S5), which increased flow rate has been increased in Step S3. Then the controller controls the fuel-mixing unit so as to increase the concentration of an aqueous methanol solution (Step S6).

In Step S6, the concentration of an aqueous methanol solution is increased, and an output voltage of the power generation unit is measured again by the voltage-measuring unit, and the measured output voltage is compared in the controller with the initial output voltage monitored in Step S1. With reference to Step S7, when the controller does not detect return of a reduced output voltage, it indicates that the aqueous methanol solution has a still lower concentration than an optimum concentration. Thus, the operation returns to Step S6, and the controller controls the fuel feeder so as to further increase the concentration of an aqueous methanol solution. When the controller detects return of a reduced output voltage, it indicates that the aqueous methanol solution has an optimized concentration. Thus, the operation shifts to Step S11 and the adjustment of the concentration completes.

In Step S9, the concentration of an aqueous methanol solution is decreased, and an output voltage of the power generation unit is measured again by the voltage-measuring unit, and the measured output voltage is compared in the controller with the output voltage monitored in Step S1. With reference to Step S10, when the controller does not detect return of a reduced output voltage, it indicates that the aqueous methanol solution has a still higher concentration than an optimum concentration. The operation returns to Step S9, and the controller controls the fuel feeder so as to further reduce the concentration of the aqueous methanol solution. When the controller detects return of a reduced output voltage, it indicates that the aqueous methanol solution has an optimized concentration. Thus, the operation shifts to Step S11 and the adjustment of the concentration completes.

Such an adjustment procedure of an aqueous methanol solution can be carried out and set not only by increasing the flow rate of fuel but also by decreasing the flow rate of fuel. The decrease of the flow rate of fuel may be carried out within a range of flow rates of fuel where the output voltage increases at a decreasing flow rate of fuel at a concentration of an aqueous methanol solution higher than its optimum concentration, and the output voltage decreases with a decreasing flow rate of fuel at a concentration of an aqueous methanol solution lower than its optimum concentration.

With reference to Step S11, when power generation is continued, the operation returns to Step S1, the voltage-measuring unit continuously measure an output voltage of the power generation unit, and the controller continuously monitors the measured output voltage. In contrast, when the operation of the fuel cell power generator is to be stopped, the controller controls the fuel feeder to stop, and the operation of the power generator stops.

This enables the adjustment of the concentration of an aqueous methanol solution to be optimal for maximizing output characteristics and electrical efficiencies of a fuel cell power generator even if sensors are not used and complicated computations are not carried out. The concentration of an aqueous methanol solution can be adjusted to be optimal according to the procedure even when the output voltage decreases due typically to degradation of a fuel cell power generator with time, because the concentration is adjusted based on the output voltage of the power generation unit. Specifically, the concentration of an aqueous methanol solution can be more flexibly adjusted according to this procedure, than a procedure of adjusting an aqueous methanol solution to have a predetermined concentration by measuring an absolute concentration typically using a sensor or carrying out computations.

In an embodiment shown in FIG. 4, the control is carried out based on whether or not a reduced output voltage returns to an initial output voltage monitored in Step S1. The control may also be carried out, for example, based on whether an output voltage increases or decreases. In this case, for example, a controller detects or determines whether the output voltage increases or decreases at an increased flow rate of fuel, after the output voltage once decreases. If the output voltage increases, it indicates that the aqueous methanol solution has a lower concentration than its optimum concentration. Accordingly, the controller controls the flow rate of fuel to return to the initial flow rate and controls the fuel-mixing unit to increase the concentration of an aqueous methanol solution. This procedure is continued until the output begins decreasing. In contrast, if the output voltage decreases, it indicates that the aqueous methanol solution has a higher concentration than its optimum concentration. Accordingly, the controller controls the flow rate of fuel to return to the initial flow rate and controls the fuel-mixing unit to decrease the concentration of an aqueous methanol solution. This procedure is continued until the output begins increasing. By this procedure, the concentration of an aqueous methanol solution can be always adjusted to its optimum concentration, and a fuel cell power generator can be always operated at a maximum output voltage.

In addition, this can be applied in the following manner. When a voltage required by a load connected to a fuel cell power generator is lower than a maximum output voltage of the fuel cell power generator, it is more efficient to carry out power generation according to this condition. In this case, it is acceptable that the controller detects or determines the required voltage of the load, and the concentration of an aqueous methanol solution is adjusted so as to make an output voltage corresponding to the required voltage. With reference to FIG. 3, when an output voltage is optimized at a flow rate of 20 cc/min an aqueous methanol solution having a concentration of 0.6 mol/l, a power generator shows an output voltage at a concentration of 0.4 mol/l lower than at a concentration of 0.6 mol/l even at the same flow rate of 20 cc/min. When a voltage required by a load is low, the concentration of an aqueous methanol solution may also be adjusted to be lower so as to yield an appropriate output voltage corresponding to the required voltage. A fuel cell power generator can be operated at a suitable output voltage corresponding to the load and can be efficiently operated, by adjusting the concentration of an aqueous methanol solution in this manner.

A controller of a fuel cell power generator may previously have a table showing how an output voltage varies depending on a flow rate of an aqueous methanol solution, as shown in FIG. 3. Possible procedures in this case are as follows. For example, how an output voltage varies depending on a varying flow rate of an aqueous methanol solution is determined, and this is compared with the table in the controller. When the output voltage decreases with an increasing flow rate, the aqueous methanol solution is adjusted to have a reduced concentration. When the output voltage increases with an increasing flow rate, the aqueous methanol solution is adjusted to have an increased concentration. This enables feeding of an aqueous methanol solution having an optimum concentration for a power generation unit at the time point upon measurement. A table contained in the controller may be so configured as to rewritable, because the output voltage may vary due typically to degradation of a power generation unit with time. By satisfying this, the controller can more easily carry out detection or determination. When an operation is efficiently carried out according to an output voltage required by a load as above, such a table enables more efficient adjustment of the concentration of an aqueous methanol solution.

As is described above, according to a method of operating a fuel cell power generator according to the present application, an aqueous methanol solution always having an optimum concentration can be fed to a power generation unit of a fuel cell power generator, even when the power generator does not have a concentration sensor. Specifically, an operation can be carried out without being affected by-products and degradation of a concentration sensor. These effects are problems when the concentration is adjusted using a concentration sensor. In addition, the concentration of an aqueous methanol solution can be adjusted so as to maximize output characteristics and electrical efficiencies according to a load and conditions of the fuel cell power generator.

A fuel cell power generator according to the present application includes a power generation unit and a fuel-mixing unit. The power generation unit is configured to carry out power generation using air and a diluted fuel containing a material fuel and water. The fuel-mixing unit is configured to adjust the concentration of the diluted fuel. The adjustment is carried out by measuring an output voltage of the power generation unit at a constant output current density of the power generation unit and at a varying flow rate of the diluted fuel to be fed to the power generation unit.

A fuel cell power generator according to the present application includes, for example, a power generation unit, a fuel feeder, a fuel-mixing unit, and a controller as illustrated in FIG. 1. The power generation unit is configured to carry out power generation using air and an aqueous methanol solution as a diluted fuel. The fuel feeder is configured to feed the aqueous methanol solution to the power generation unit at a predetermined rate. The fuel-mixing unit is configured to adjust the aqueous methanol solution to have a predetermined concentration. The controller is configured to determine whether the concentration of the aqueous methanol solution is increased or decreased in the fuel-mixing unit, based on the output voltage of the power generation unit and the flow rate of the aqueous methanol solution from the fuel feeder. The concentration of the aqueous methanol solution is adjusted according to a control method as illustrated in FIG. 4.

The controller is configured to increase the flow rate of an aqueous methanol solution when the output voltage of the power generation unit decreases and to detect how the output voltage of the power generation unit varies, as illustrated in FIG. 4. Thus, an aqueous methanol solution having an optimum concentration can be fed to the power generation unit by controlling to increase the concentration of the aqueous methanol solution when the output voltage increases, and to decrease the concentration of the aqueous methanol solution when the output voltage decreases.

Accordingly, a fuel cell power generator 1 according to the present application enables feeding of an aqueous methanol solution always having an optimum concentration to a power generation unit 2. In addition, it enables feeding of an aqueous methanol solution always having an optimum concentration to a power generation unit 2 even when load and conditions such as deterioration of the fuel cell power generator 1 vary. Thus, there may be provided maximum output characteristics and electrical efficiencies.

Some embodiments relating to a method of operating a fuel cell power generator, and a fuel cell power generator according to the present application have been described above. A material fuel is not limited to methanol as used in these embodiments and can be any fuel used in fuel cells. For example, ethanol or dimethyl ether can be used. The above-mentioned operation is carried out while monitoring an output voltage. However, it is also acceptable to carry out an operation of a fuel cell power generator according to the present application while monitoring an output current by arranging, for example, a current measuring unit in a power generation unit, which current-measuring unit is configured to measure an output current.

It should be understood that various changes and modifications to the presently preferred embodiments described herein will be apparent to those skilled in the art. Such changes and modifications can be made without departing from the spirit and scope of the present application and without diminishing its intended advantages. It is therefore intended that such changes and modifications be covered by the appended claims.

The invention claimed is:

1. A method of operating a fuel cell power generator including a power generation unit configured to carry out power generation using air and a diluted fuel containing methanol and water, the method comprising:
feeding the air and the diluted fuel containing methanol and water to the power generation unit;
measuring an output voltage of the power generation unit;
changing a flow rate of the diluted fuel to be fed to the power generation unit without changing a concentration of the diluted fuel;
determining whether the output voltage increases or decreases in response to the changed flow rate of the diluted fuel;
adjusting the concentration of the diluted fuel fed to the power generation unit based on how the output voltage responds to the change in the flow rate of fuel; and
returning the changed flow rate of the diluted fuel back to an initial flow rate of the diluted fuel after determining whether the output voltage increases or decreases in response to the changed flow rate of the diluted fuel.

2. The method of operating a fuel cell power generator according to claim 1, further comprising:
increasing the concentration of the diluted fuel when an output voltage of the power generation unit increases with an increased flow rate of the diluted fuel at a constant current density of a current outputted from the power generation unit, and
decreasing the concentration of the diluted fuel when an output voltage of the power generation unit decreases with an increased flow rate of the diluted fuel at a constant current density of a current outputted from the power generation unit.

3. The method of operating a fuel cell power generator according to claim 1, further comprising adjusting the concentration of the diluted fuel based on output voltages being previously determined at a varying flow rate of fuel and at two or more different concentrations of the diluted fuel respectively.

4. The method of operating a fuel cell power generator according to claim 1, further comprising measuring a temperature of the power generation unit and adjusting the concentration of the diluted fuel based on the temperature of the power generation unit.

* * * * *